US012312857B2

(12) United States Patent
Schmidt et al.

(10) Patent No.: US 12,312,857 B2
(45) Date of Patent: May 27, 2025

(54) DOOR ACTUATION SYSTEM AND METHOD

(71) Applicant: Transportation IP Holdings, LLC, Norwalk, CT (US)

(72) Inventors: Timothy Robert Schmidt, Arlington Heights, IL (US); Frank Golemis, Skokie, IL (US); Karl Kobel, Wildwood, IL (US); Robert Johnson, Sebastian, FL (US); Matthew Chapman, Buffalo Grove, IL (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 18/097,434

(22) Filed: Jan. 16, 2023

(65) Prior Publication Data

US 2024/0240508 A1 Jul. 18, 2024

(51) Int. Cl.
*E05F 17/00* (2006.01)
*E05F 15/63* (2015.01)

(52) U.S. Cl.
CPC ............ *E05F 17/004* (2013.01); *E05F 15/63* (2015.01); *E05F 2017/008* (2013.01); *E05Y 2201/21* (2013.01); *E05Y 2201/434* (2013.01); *E05Y 2201/47* (2013.01); *E05Y 2201/686* (2013.01); *E05Y 2400/31* (2013.01); *E05Y 2400/40* (2013.01); *E05Y 2400/44* (2013.01); *E05Y 2400/45* (2013.01); *E05Y 2900/531* (2013.01)

(58) Field of Classification Search
CPC ... E05F 17/004; E05F 15/63; E05F 2017/008; E05Y 2201/21; E05Y 2201/434; E05Y 2201/47; E05Y 2201/686; E05Y 2400/31; E05Y 2400/40; E05Y 2400/44; E05Y 2400/45; E05Y 2900/531
USPC .......... 49/104, 107, 108, 109, 110, 111, 112, 49/113, 114, 116, 118, 122, 246, 247, 49/253
See application file for complete search history.

(56) References Cited

U.S. PATENT DOCUMENTS

| | | | | |
|---|---|---|---|---|
| 1,191,897 A | | 7/1916 | Hild | |
| 2,893,506 A | * | 7/1959 | Daugirdas ............... | E05F 15/40 49/110 |
| 3,826,042 A | | 7/1974 | Daugirdas et al. | |
| 3,844,062 A | * | 10/1974 | Daugirdas ............. | E05F 15/649 49/363 |

(Continued)

FOREIGN PATENT DOCUMENTS

| | | |
|---|---|---|
| EP | 1258591 A1 | 11/2002 |
| JP | 2000142392 A | 5/2000 |

*Primary Examiner* — Jerry E Redman
(74) *Attorney, Agent, or Firm* — K&L Gates LLP

(57) ABSTRACT

A door actuation system may include an actuation device to move a first door leaf and a second door leaf between an open and a closed position. The actuation device may provide an open preload force in the open position. The actuation device may provide a closed preload force in the closed position. The system may include one or more of: a first engagement member that may contact the actuation device and may allow movement of the actuation device to adjust the open and closed preload force; or the actuation device may be coupled with the first door leaf by a first rod and the second door leaf by a second rod, at least one of the first or second rod may adjust a length of the first or second rod to maintain the open preload force in the open position and the closed preload force in the closed position.

20 Claims, 5 Drawing Sheets

(56) References Cited

U.S. PATENT DOCUMENTS

| | | | | | |
|---|---|---|---|---|---|
| 4,087,939 | A * | 5/1978 | Elguindy | E05F 17/004 | 49/118 |
| 4,322,912 | A | 4/1982 | Heinrich | | |
| 4,346,533 | A | 8/1982 | Britzke et al. | | |
| 4,375,140 | A | 3/1983 | Blair et al. | | |
| 4,378,656 | A | 4/1983 | Heinrich et al. | | |
| 4,583,324 | A * | 4/1986 | Storz | E05F 5/12 | 49/367 |
| 4,619,076 | A * | 10/1986 | Livingston | A62C 2/248 | 49/7 |
| 4,967,512 | A * | 11/1990 | Schroder | E05F 5/12 | 49/367 |
| 5,332,279 | A * | 7/1994 | Golemis | E05F 15/63 | 411/956 |
| 6,125,768 | A * | 10/2000 | Kurnik | E05F 15/63 | 49/108 |
| 6,449,904 | B1 * | 9/2002 | Paasonen | E05F 5/12 | 49/366 |
| 6,564,510 | B2 * | 5/2003 | Juntunen | E05F 5/12 | 49/366 |
| 6,742,302 | B2 | 6/2004 | Kirkkäinen | | |
| 6,877,278 | B2 * | 4/2005 | Karkkainen | E05F 5/12 | 49/366 |
| 7,971,391 | B2 | 7/2011 | Harie | | |
| 7,997,028 | B2 * | 8/2011 | Holst | E05D 15/30 | 49/248 |
| 8,291,642 | B2 * | 10/2012 | Jankovsky | E05F 15/611 | 49/117 |
| 8,484,892 | B2 | 7/2013 | Giannis | | |
| 9,869,118 | B2 * | 1/2018 | Schmidt | E05F 15/657 | |
| 2003/0205000 | A1 | 11/2003 | Pagowski | | |
| 2021/0270074 | A1 | 9/2021 | Andler et al. | | |
| 2024/0240508 | A1 * | 7/2024 | Schmidt | E05F 15/611 | |

* cited by examiner

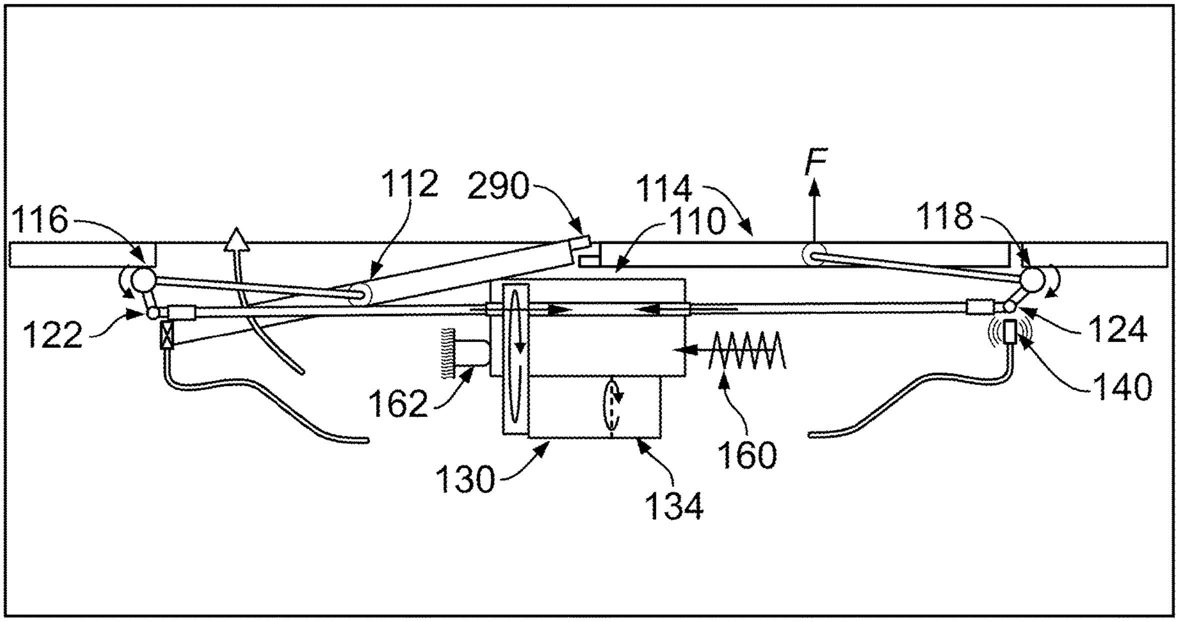

FIG. 9

1000

1002

Loading a first door leaf and a second door leaf in an open position with an open preload force from an actuator driven by a motor

1004

Loading a first door leaf and the second door leaf in a closed position with a closed preload force from the actuator

1006

Controlling the open preload force and the closed preload force by loading a spring contacting the actuator and allowing movement of the actuator

FIG. 10

DOOR ACTUATION SYSTEM AND METHOD

BACKGROUND

Technical Field

The present disclosure relates generally to systems and methods for door actuation.

Discussion of Art

Present door actuation systems for dual door systems on a vehicle may include a linked door system. The linked door system may need to balance the forces on two doors. For vehicle doors, adequate preloading for the doors in the closed position may be important to prevent the doors from shifting under aerodynamic and vibration loading, which can result in noise and wear. For aerodynamic loading, as a door shifting can result in door buffeting and can result in an unstable increase in aerodynamic loading as the door leading edge shifts outward that may result in failure of the door.

The preloading of the doors in the open position may be important to prevent door rattle. For some door systems, such as the slide glide system, passenger handles may be located on the door for use when the door is open. In this setup, the door open preload may be important to prevent the door and thus the handle from shifting and causing loss of balance and potential injury when the passenger uses the handle for assistance.

Currently, many systems that use linked door systems, such as with connecting rods, the door preloading may be controlled by having a preset teeter rotation, setting a nominal linkage geometry for expected nominal conditions, and then adjusting variable linkages such as a length of connecting rods to account for variations in actual geometry. This may be a laborious and difficult operation that may be prone to error. With the teeter rotation fixed, increases to the door closed preload may decrease the door open preload and vice versa. This may be further complicated by having to adjust the relative preloading of each panel in each position.

It may be desirable to have a system and method that differs from those that are currently available.

BRIEF DESCRIPTION

In accordance with one example or aspect, a system is provided that may include an actuation device, a first door leaf, a second door leaf, and a first engagement member. The actuation device may move the first door leaf and the second door leaf between an open position and a closed position. The actuation device may provide an open preload force to the first door leaf and the second door leaf in the open position. The actuation device may provide a closed preload force to the first door leaf and the second door leaf in the closed position. The system may include one or more of: a first engagement member that may contact the actuation device, the first engagement member may allow movement of the actuation device to adjust the open preload force and the closed preload force; or the actuation device may be coupled with the first door leaf by a first rod and to the second door leaf by a second rod, at least one of the first rod or the second rod may adjust a length of the first rod or the second rod to maintain the open preload force in the open position and maintain the closed preload force in the closed position.

In accordance with one example or aspect, a system is provided that may include an actuation device, a first door leaf, a second door leaf, a controller, and a first engagement member. The actuation device may move the first door leaf and the second door leaf between an open position and a closed position. The first door leaf and the second door leaf may be held in the open position by an open preload force from the actuation device. The first door leaf and the second door leaf may be held in the closed position by a closed preload force from the actuation device. The first engagement member may contact the actuation device. The controller may adjust the open preload force and the closed preload force by moving the actuation device relative to the first engagement member.

In accordance with one example or aspect, a method is provided that may include loading a first door leaf and a second door leaf in an open position with an open preload force from an actuation device. The method may include loading the first door leaf and the second door leaf in a closed position with a closed preload force from the actuation device. The method may include controlling the open preload force and the closed preload force by loading a spring contacting the actuation device and allowing movement of the actuation device.

BRIEF DESCRIPTION OF THE DRAWINGS

The subject matter may be understood from reading the following description of non-limiting embodiments, with reference to the attached drawings, wherein below:

FIG. 9 shows the door actuation system of FIG. 1 in an intermediate position, according to one example; and FIG. 10 shows a flow chart of a method of controlling door actuation, according to one example.

DETAILED DESCRIPTION

Figure 1:
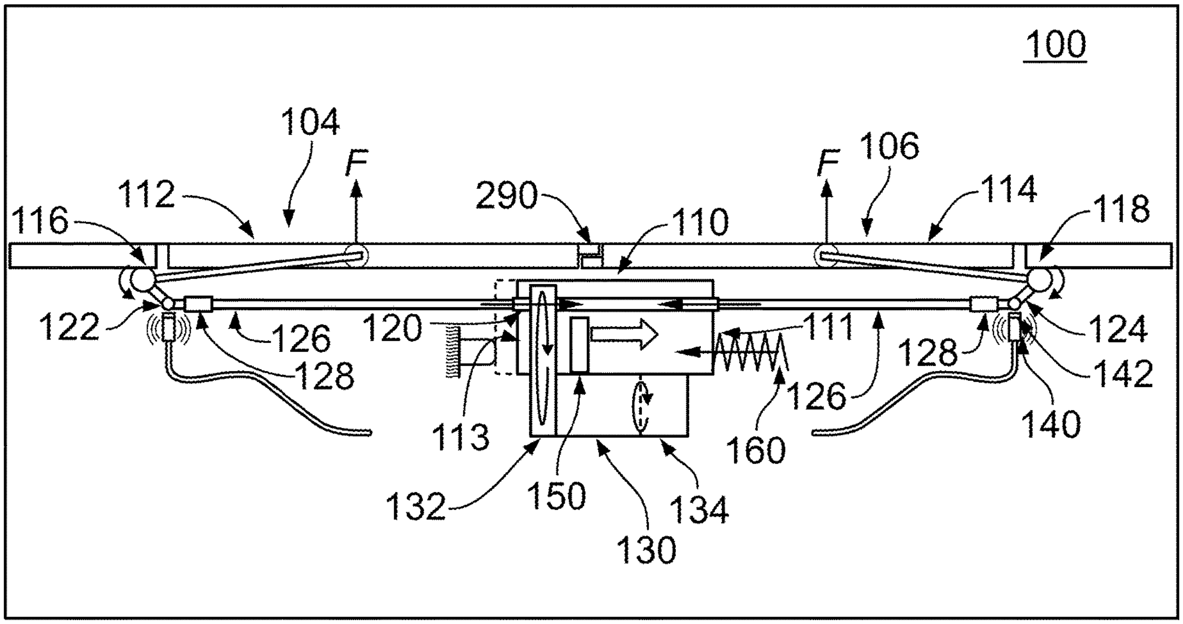
FIG. 1 shows a schematic overview of a door actuation system in a closed position, according to one example.

Examples of the subject matter described herein relate to a door actuation system or a method of door actuation. The door actuation system may include a multi-door system on a vehicle. The door actuation system may include a single prime mover using a drive system that links two or more door leaves of the multi-door system.

One benefit of the single prime mover using the drive system that links the doors is that, in the event the vehicle is on a slope perpendicular to the door orientation (i.e., upward or downward pitch for a side door), the gravitational force pushing one door open or closed may be balanced through the connecting rods to an opposite force on the second door. This may allow the prime mover to be smaller relative to a system without a link between the doors, as the prime mover may only have to act against the slight force imbalance rather than the entire weight.

Additionally, it may occur that the doors may have to resist an opening or closing force applied to the doors. The force may be applied to either door independently or distributed over both doors. For a linked system, a linkage between the doors may distribute the required force to the doors as required and the prime mover may need to be sized to resist a maximum force of opening and/or closing. For multiple independent prime movers, each of the prime movers may need to be sized to resist the whole maximum force of opening or closing in the event that the entire force is applied to a given door and thus is of similar rated force to the single prime mover of a linked system (i.e., the independent drive requires twice the total force resistance capacity). As an example, with dual independent prime movers, a person applying a 300-pound force to a fore door would require a fore door prime mover to hold against the full force while an aft prime mover does not assist. Likewise, a 300-pound force to an aft door must be resisted by the aft door prime mover alone as the fore door prime mover does not assist. If applied to both doors equally, the prime movers may each resist 150-pounds of force. Thus, at least two prime movers capable of withstanding 300-pounds of force applied to the door may be needed.

In the same scenario with a single linked prime mover, the prime mover may have to resist a 300-pound door force for all cases and so only a single prime mover of the same size may be required. As a motor and a gear box driving the doors may be a significant cost to the system, this may represent a significant cost savings.

For a linked door system, the coordination of the door motion to ensure that the doors do not collide and may be moved in the correct sequence may be built into the linkage mechanism without the need for additional controls. For a linked system, only one prime mover may be required and thus duplicate motors, sensors, and control devices may not be required.

While one or more embodiments are described in connection with a bus or rail vehicle system, not all embodiments are limited to bus or rail vehicle systems. Unless expressly disclaimed or stated otherwise, the subject matter described herein extends to automobiles, trucks (with or without trailers), buses, marine vessels, aircraft, unmanned aircraft (e.g., drones), mining vehicles, agricultural vehicles, or other off-highway vehicles. The vehicle systems described herein (rail vehicle systems or other vehicle systems that do not travel on rails or tracks) may be formed from a single vehicle or multiple vehicles. With respect to multi-vehicle systems, the vehicles may be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

Figure 6:
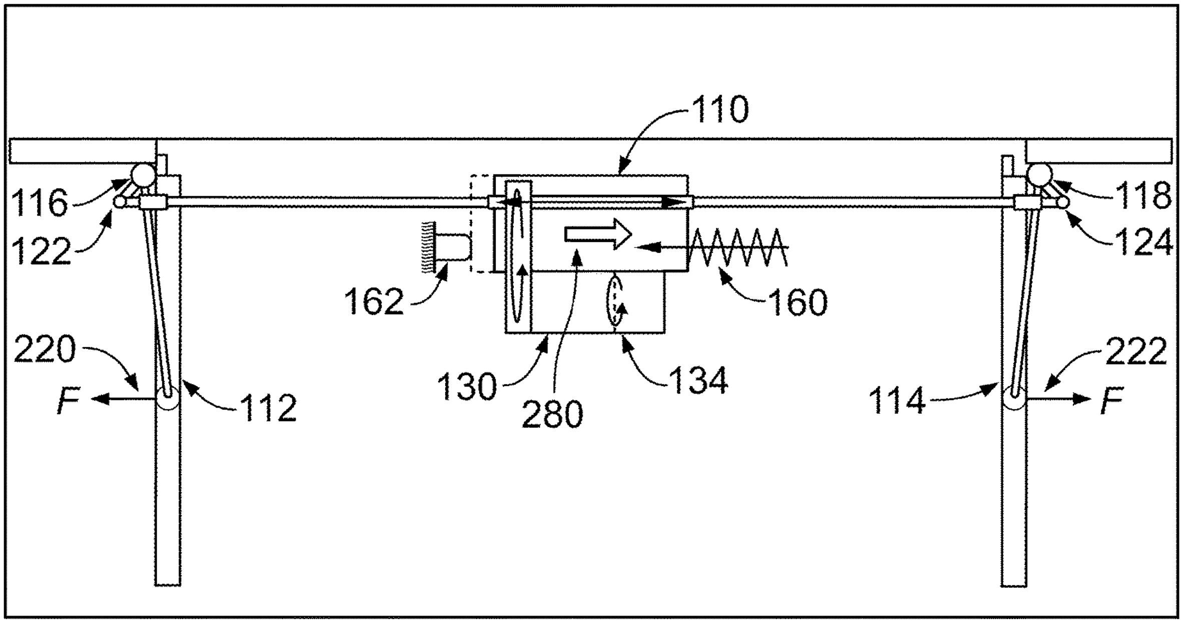
FIG. 6 shows the door actuation system of FIG. 1 in an open position, according to one example.

FIG. 1 illustrates a schematic overview of a door actuation system 100 in a closed position, according to one example. The door actuation system may be a door system, such as a dual panel door, including a first door assembly 104 and a second door assembly 106. In other examples, the door system may include more than two door assemblies. The first door assembly may include a first door leaf 112 and the second door assembly may include a second door leaf 114. The first and second door leaves may be movable between a closed position, as shown in FIG. 1, and an open position as shown in FIG. 6. The dual panel door may be on a vehicle, for example a bus, a train, an automobile, a maritime vehicle, or the like.

The first door leaf may be coupled with a first shaft 116. The second door leaf may be coupled to a second shaft 118. The door actuation system may include a drive shaft 120 coupled to screws 126 and coupled with a first clevis 122 and a second clevis 124. In one example, the screws may be ball screws or lead screws. The screws may drive nuts 128 that are connected to the clevises. In one example, the nuts may be ball nuts, lead screw nuts, or the like. The first shaft and the second shaft may be coupled with the drive shaft. The drive shaft may be driven by an actuator 110 and may move the first and second door assemblies between the open position and the closed position.

The door actuation system may include an actuation device. The actuation device may include the actuator. In one example, the actuation device may include the actuator driven by a motor. In one example, the actuation device may include a linear motor actuator, however in other examples, the actuation device may include an electromechanical actuator, electrohydraulic actuator, rotary motor actuator, a pneumatic actuator, or the like. In one example, the actuation device may include an electric motor, a stepper motor, a telescopic hydraulic cylinder, a pulley, or the like. In one example, the actuation device may be moveable. The actuation device may provide controlled movements to, and positioning of, the doors. The actuation device may act as a prime mover driving the first door assembly and the second door assembly between the open and closed positions. The door actuation system may include a controller 150 that may send a control signal to the actuation device and a motor 130 of the actuation device. In one example, the actuation device may be driven by the motor. In one example, the motor may be physically separate from the actuation device, but the motor may be coupled to and may power the actuation device. The controller may be positioned within the door actuation system or may be positioned remotely from the door actuation system. The controller may include microcontrollers, processors, microprocessors, or other logic devices that operate based on instructions stored on a tangible and non-transitory computer readable storage medium, such as software applications stored on a memory.

The motor may be coupled with a torque transfer mechanism 132. The transfer mechanism may be a mechanical device that may receive and transmit rotation and torque. In one example the transfer mechanism may be one or more gears, shaft levers, rack and pinons, pulleys, or the like. The actuator may be driven by the motor through the torque transfer mechanism to the drive shaft. The motive power provided by the motor through the torque transfer mechanism may allow the drive shaft to open and close the first and second door leaves. The door actuation system may provide a preload force on the doors in the open position as well as a preload force on the doors in the closed position. The preload force may be a holding force to secure the doors in a given position (e.g., an open position or a closed position). The preload forces may ensure that the doors remain in the desired position.

The door actuation system may include an actuator brake 134, also referred to as an actuation device brake, that may be coupled with the motor and may hold the actuator in a given position. The actuator brake may be a protrusion positioned to be inserted into an aperture of the actuator to inhibit movement of the actuator. The actuator brake may provide a friction force against the actuator to inhibit movement of the actuator. In other embodiments, the actuator brake may apply a mechanical or electrical force to inhibit movement of the actuator. The actuator brake may be operatively coupled with the controller. The controller may communicate an actuator brake engage signal to the actuator brake to initiate and maintain the actuator brake. The controller may communicate an actuator disengage signal to the actuator brake to disengage and not re-engage the actuator brake until the actuator disengage signal is removed.

Figure 2:
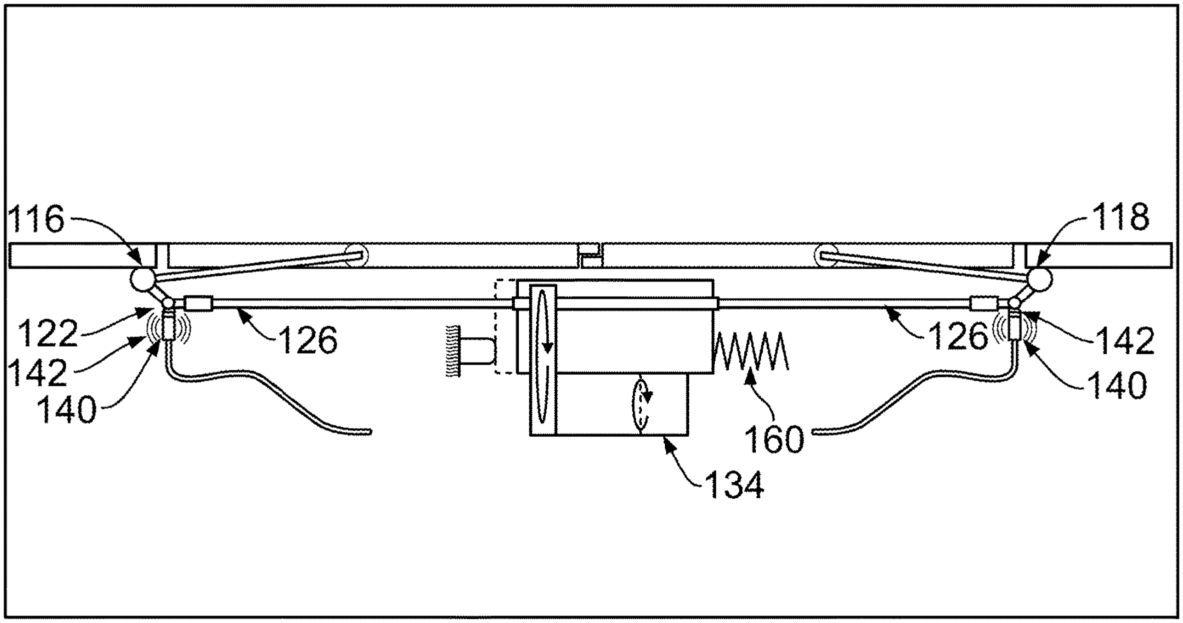
FIG. 2 shows the door actuation system of FIG. 1, according to one example.

In the closed position, the actuator brake may be engaged to hold a preloaded position where the actuator may be in tension, as shown in FIGS. 1 and 2. The actuator brake may provide a torque through the torque transfer mechanism to hold rotation of the screws. The held screws may then hold a preload force against the door shafts and the door leaves to hold the door leaves in the closed position. The actuator may push against a first engagement member 160 to a floating position. The floating position may be a position where a first side 111 of the actuator is engaging only the first engagement member and a second side 113 of the actuator may not be engaging any surface, i.e., the second side of the actuator may be in the floating position. The first engagement member may be a compensating mount bias spring, a torsion spring, a gas spring, a bumper, or the like. In the floating position, forces from the first shaft and the second shaft as well as the first engagement member may reach an equilibrium state to ensure that both the first door leaf and the second door leaf are preloaded in the closed position.

In one example, the door actuation system includes one or more sensors. The sensors may include electrical sensors or mechanical sensors. The electrical sensors may include an ohmmeter measuring electrical resistance, a voltmeter measuring electrical potential in volts, an impedance analyzer measuring impedance, an ammeter measuring current, a database or memory, an input device (e.g., control panel, switch, keyboard, etc.), or the like. The electrical sensors may read the electrical characteristics of components of the door actuation system, for example the motor. The mechanical sensor may include an optical sensor (e.g., an infrared sensor, a proximity detector), an acoustic sensor (e.g., an ultrasonic sensor), a capacitive sensor, a photoelectric sensor, an inductive sensor, a laser distance sensor (e.g., Light Detection and Raging ["LIDAR"]), or the like. The mechanical sensors may measure physical characteristics components of the door actuation system or the environment around the door.

In one example, a sensor may determine an output torque of the motor. The sensor may communicate a signal indicative of the motor output torque to the controller. The controller may determine whether the motor output is within a predetermined range indicative of normal motor operation and performance. If the motor output torque is not within the predetermined range, the controller may adjust one or both of the preload force in the open position and the preload force in the closed position, such that the motor output torque may return to the predetermined range. This may allow the controller to automatically monitor the motor and adjust the preload forces accordingly.

In one example, the door actuation system includes a door fully closed (DFC) position sensor 140. The DFC sensor may be positioned to sense that a target 142 connected to the door shaft may be in the fully closed position. The DFC sensor may be positioned adjacent the first shaft, the second shaft, or both the first and second shafts. Additionally, the DFC sensor may be place at a different location on one or both of the first door assembly or the second door assembly. Where only the DFC sensor is coupled with only one door assembly, the DFC sensor may be coupled with the door assembly that closes last.

The DFC sensor may communicate with the controller to indicate when the door is in the fully closed position. Additionally, the DFC sensor may determine a change in position of one or both the first door assembly and the second door assembly and the DFC sensor may communicate the change to the controller. The controller may then use the output received from the DFC sensor to adjust operation of the door actuation system. For example, where the DFC sensor output indicates that the door assemblies may have reached the fully closed position the controller can assume that collisions detected as back torque on the actuator motor may be caused by the door preloading and not an unplanned collision that may require the door to respond to by stopping or reversing motion. The controller may also be able to change to a mode where increased torques are applied to the motor to provide proper door preloading.

In one example, the door actuation system may include a door fully open (DFO) position sensor. The DFO sensor may be positioned on one or both of the first and second door assembly to indicate whether the first door assembly and/or the second door assembly are in the fully open position.

A door open command may be applied to the door assembly in the closed position in order to initiate the opening of the door assembly. The first engagement member may bias the actuator overall motion in such a way to move the first door assembly before the second door assembly to prevent a collision during the opening process. In another example, bias driven by the first engagement member may direct the second door assembly to open before the first door assembly to prevent a collision during the opening process.

Figure 3:
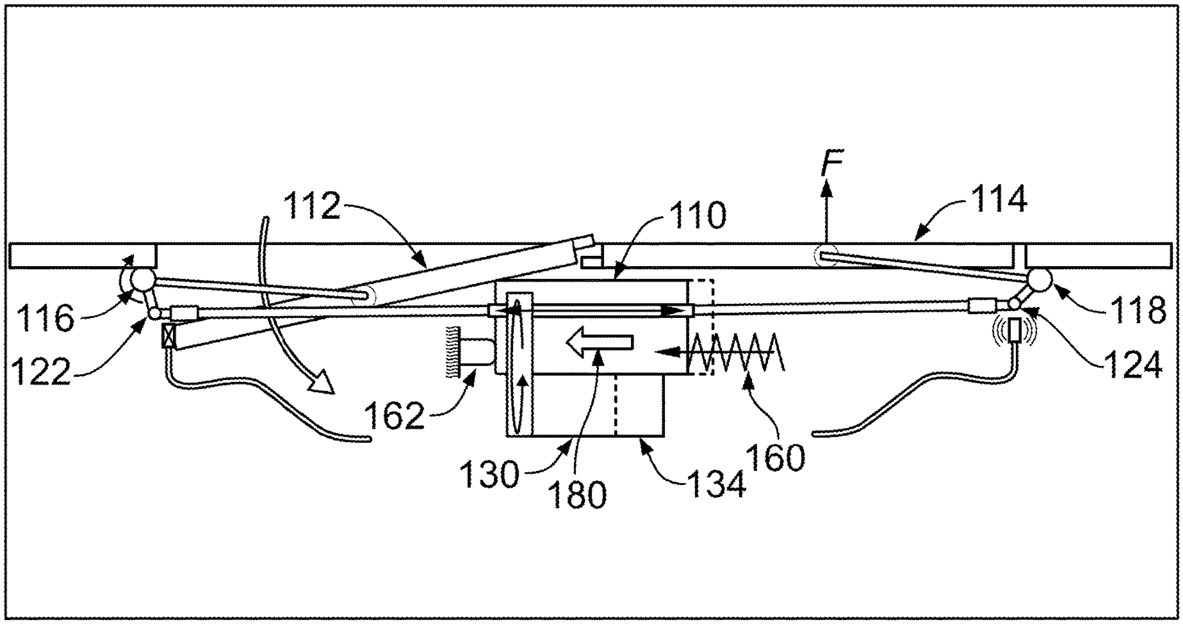
FIG. 3 shows the door actuation system of FIG. 1 in an intermediate position, according to one example.

FIG. 3 illustrates the door actuation system in an intermediate position, where a door open command has been applied. In response to the door open command, the actuator brake may be disengaged. The actuator brake may be electrically disengaged, mechanically disengaged, or both. The motor may then be engaged. The motor may drive the clevises outward. The clevises may drive the first shaft clockwise and the second shaft counterclockwise. During the initial motion, the first engagement member may drive the actuator center forward in the direction of the first door leaf, as illustrated by arrow 180. The movement of the actuator in the center forward direction may prevent movement the second door assembly by directing the motive force toward the first door assembly. The DFC sensor may determine that the first door sensor has shifted, which may indicate that the first door assembly has begun motion. The actuator then may move to a point of contact with a second engagement member 162. In the illustrated embodiment, the second engagement member may be a bumper, however in other embodiments, the second engagement member may be a spring. The first engagement member and the second engagement member may hold the actuator in a fixed position and to allow both door leaves to move. In one example, the actuator may engage the first engagement member and the second engagement member during movement of the first door leaf and the second door leaf between the open position and the closed position.

As a result of the position of the actuator being slightly offset from the center of the system, the first door leaf may lead the second door leaf during the opening of the doors. In another embodiment, the actuator may be slightly offset from the center in the other direction (e.g., in the direction of the first door assembly), which may allow the second door leaf to lead the first door leaf during the opening of the doors.

Figure 4:
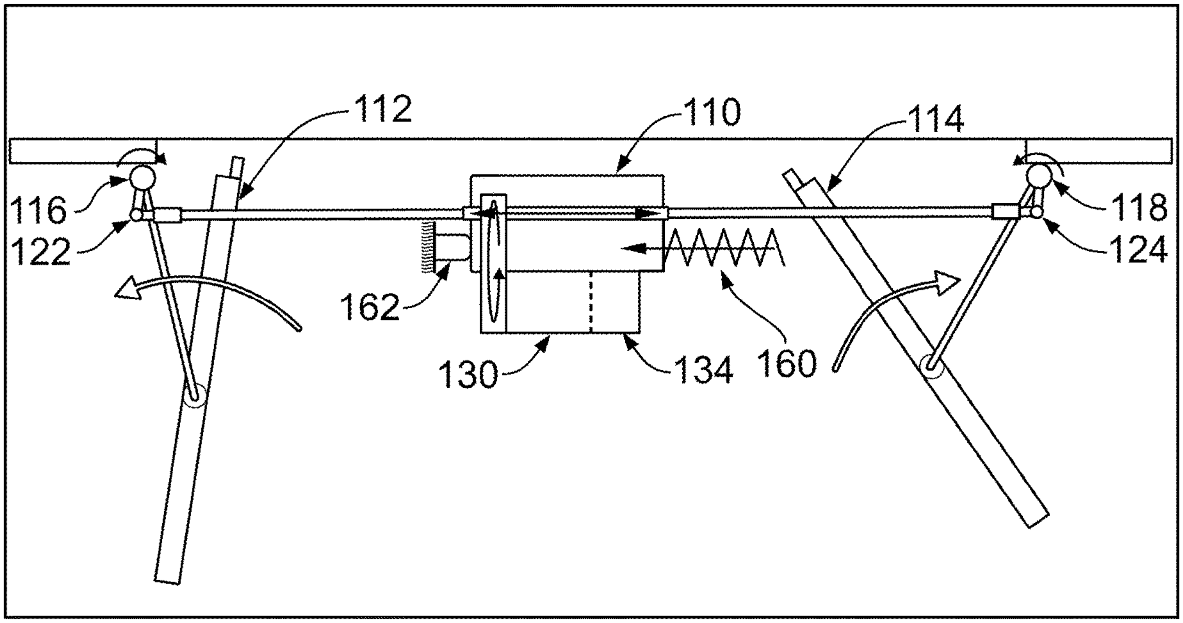
FIG. 4 shows the door actuation system of FIG. 1 in an intermediate position, according to one example.

FIG. 4 illustrates the door actuation system in an intermediate position, where the first door assembly may not be in a fully open position and the second door assembly may not be in a fully open position. Both the first door assembly and the second door assembly may be moving toward the fully open position. During the movement of the first and second door assemblies, the actuator may remain in the fixed position in which the actuator may be engaging the first engagement member on the first side and may be engaging the second engagement member on the second side. The fixed position may allow the motive force from the motor and actuator to be applied to both the first door assembly and the second door assembly.

Figure 5:
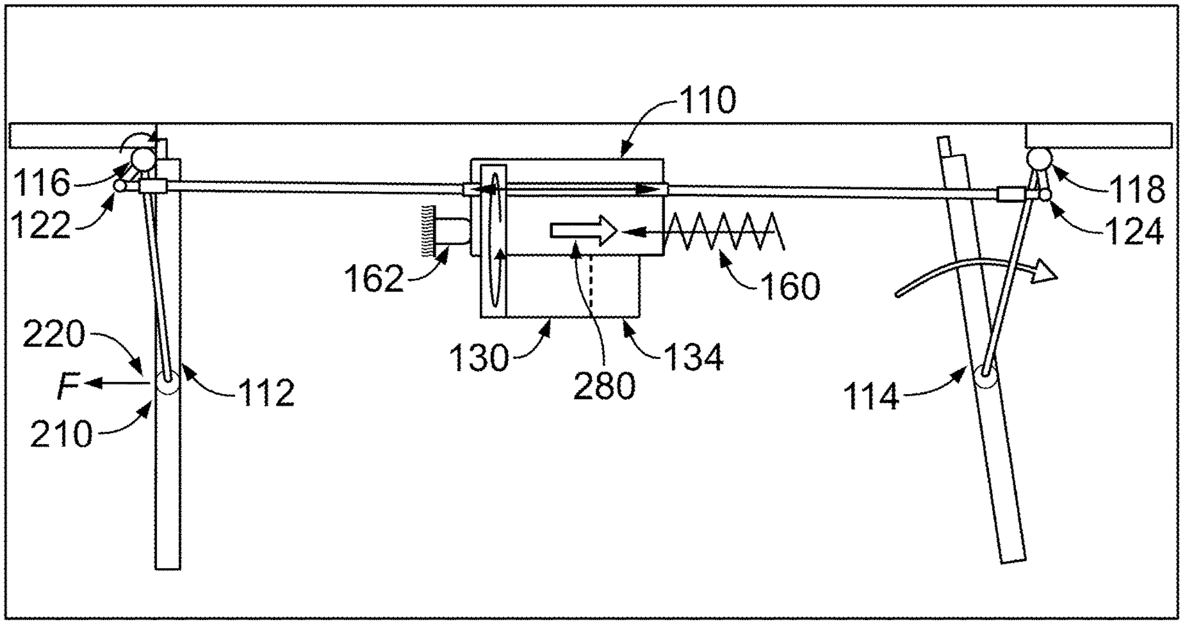
FIG. 5 shows the door actuation system of FIG. 1 in an intermediate position, according to one example.

FIG. 5 illustrates the door actuation system in an intermediate position, where the first door assembly reaches a fully open position and the second door assembly is not in a fully open position. When the first door assembly reaches the fully open position 210, a first door backload force 220 on the first door shaft may push against the first engagement member and may force the actuator in a direction opposite the first door backload force, as indicated by arrow 280. The movement of the actuator may continue until both doors are in a fully open position.

FIG. 6 illustrates the door actuation system in an open position, where the first door assembly reaches a fully open position and the second door assembly reaches a fully open position. In the fully opened position, a second door backload 222 from the second door assembly may reach an equilibrium with the first door backload and the force from the first engagement member. The equilibrium may provide a center for the actuator where both the first door assembly and the second door assembly have sufficient preload force in the open position. The preload force in the open position may allow the doors to be held in the open position even when a force may act on the first or second door assembly, for example a passenger holding a handle of the door or bumping into the door. Once the preload force is reached, the actuator brake disengage signal may be removed, which may allow the actuator brake to re-engage, as illustrated in FIG. 6.

In the door open position, the actuator brake may be engaged to hold the preloaded position where the actuator is in compression. The actuator brake torque may act through the torque transfer mechanism to hold the rotation of the screws, as well as the clevises. The clevises then may hold the preload forces against the door shaft and through the preload on the door shaft, hold the door in the open position. The actuator may push against the first engagement member to the floating position where the forces from the first shaft, the second shaft, and the engagement member may reach an equilibrium state to ensure that both the first door leaf and the second door leaf are preloaded in the open position.

During the motion of the door assemblies, a sensor may monitor the current of the motor. The sensor may output a motor current to the controller. The motor current may be monitored for values that exceed a predetermined threshold value. Excessive current values above the threshold value may indicate a collision between an object or person and the door. Additionally, one or both of the first door assembly or the second door assembly may include a sensitive leading edge 290. The sensitive leading edge may include a sensor, such as a pressure sensor, a strain gauge, a piezoelectric sensor, or the like. The sensitive leading edge may be an additional indicator of whether an obstacle may be in the path of the door or whether a collision has occurred. In one embodiment, the sensitive leading edge may be positioned at an end of the door leaves. If a collision is detected based on the sensitive leading edge, the motor current, or both, the controller may direct the door to reverse motion or stop motion. In one example, if a collision is detected, the doors may reverse motion and attempt to close again. If repeated collisions are detected, the controller may stop the door motion. The controller may communicate an alert in response to a collision being detected. Other collision detection sensors may be incorporated.

Figure 7:
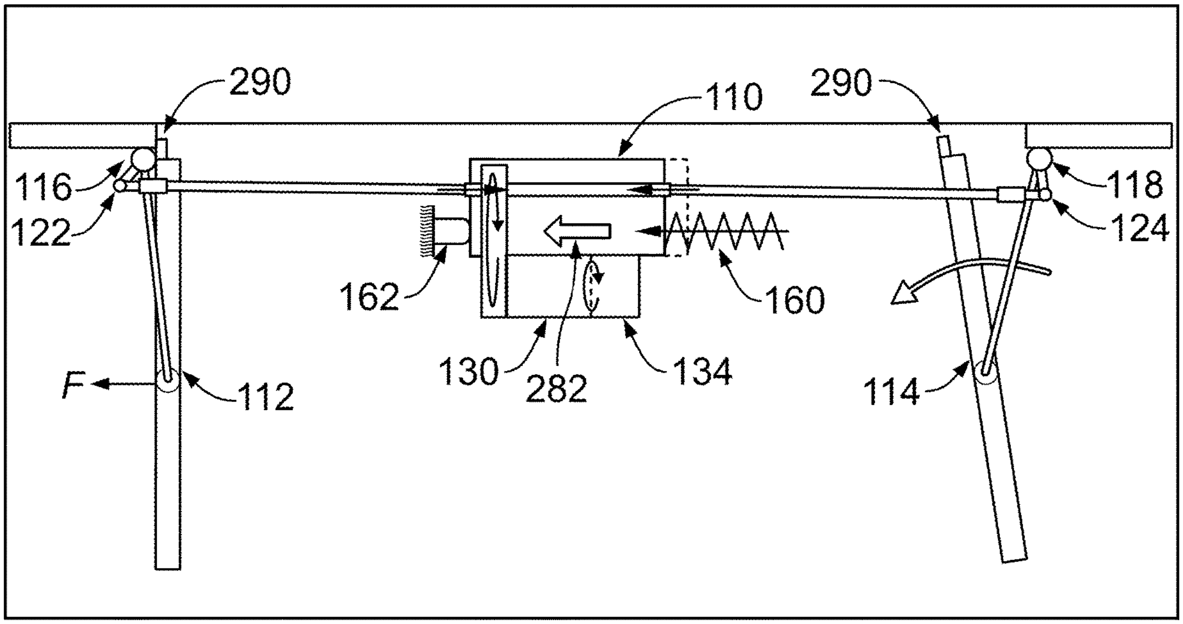
FIG. 7 shows the door actuation system of FIG. 1 in an intermediate position, according to one example.

When the door is in the fully open position, a door close command may be applied to initiate the closing of the doors. FIG. 7 illustrates the door actuation system in an intermediate position, where the first door assembly is in the fully open position and the second door assembly is initiation a closing movement. When the door close command is applied, the actuator brake may be disengaged. The motor may then be engaged to drive the clevises inward. The clevises may then drive the first shaft counterclockwise and the second shaft clockwise. During the initial motion, the first engagement member may drive the actuator center toward the first door leaf, as shown by arrow 282. This movement of the actuator may prevent the first door leaf from moving.

Figure 8:
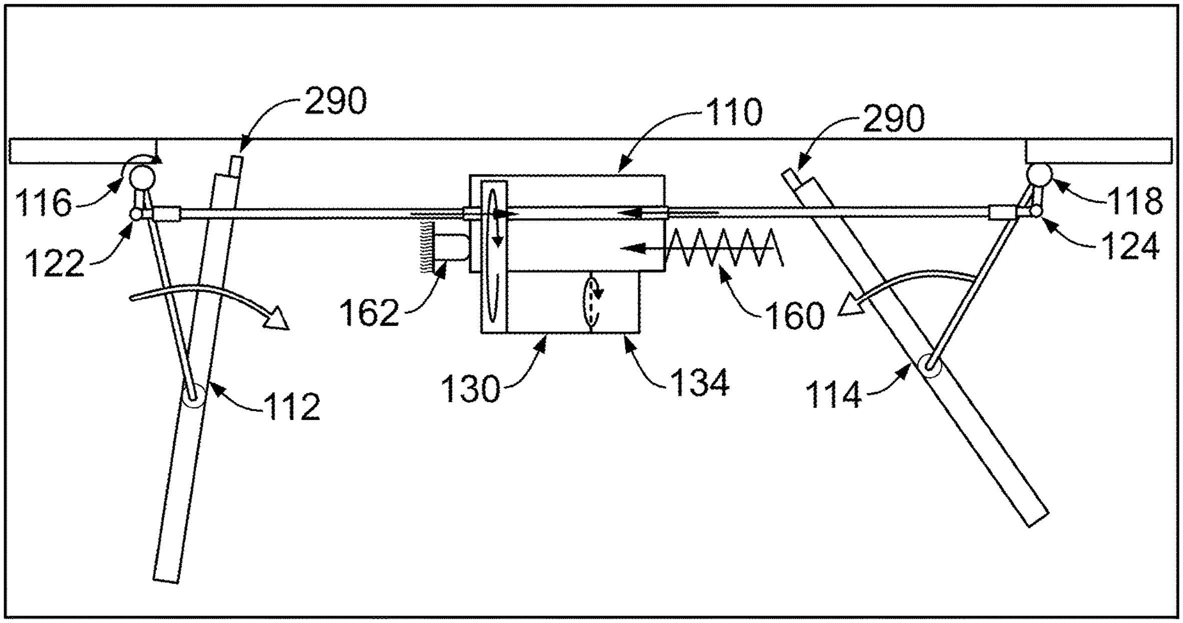
FIG. 8 shows the door actuation system of FIG. 1 in an intermediate position, according to one example.

Once the actuator has moved into contact with the second engagement member, the first engagement member and the second engagement member may hold the actuator in a fixed position. As shown in FIG. 8, the fixed position may allow both door leaves to move. As a result of the actuator center being slightly offset, the second door leaf may lead the first door leave and the second door leaf may reach the closed position first, as shown in FIG. 9. This may allow the doors to be in the proper phase to prevent the first door assembly and the second door assembly from colliding.

FIG. 10 illustrates a flow chart of a method 1000 of controlling door actuation, according to one example. At step 1002, the method may include loading a first door leaf and a second door leaf in an open position with an open preload force from an actuator driven by a motor. In the open position, the first door leaf may provide a first door back load and the second door leaf may provide a second door backload 222. The first door backload and the second door backload may reach an equilibrium with actuator to provide the open preload force. In one example, the actuator may include a first engagement member that may contribute to the open preload force. the first door backload and the force from the first engagement member. The open preload force may allow the doors to be held in the open position At step 1004, the method may include loading the first door leaf and the second door leaf in a closed position with a closed preload force from the actuator. The closed preload force may allow the doors to be held in the closed position.

At step 1006, the method may include controlling the open preload force and the closed preload force by loading a spring contacting the actuator and allowing movement of the actuator. The actuator may engage the spring and push against the spring to a floating position where the first door backload and the second door backload reach an equilibrium with the force from the spring. This equilibrium may ensure that the doors are adequately preloaded. The open preload force and the closed preload force may be adjusted based on operating characteristics of the door actuation system. For example, the preload forces may be adjusted based on one or more of a motor current, a motor output, a moving speed of the first door leaf, a moving speed of the second door leaf, a position of the first door leaf, or a position of the second door leaf. In one example, movement of the actuator may be prevented in the open position and the closed position with an actuator brake.

In one example, the actuator may have a fixed position rather than a movable or adjustable position as previously described. In this embodiment, the actuator may not be moved by the engagement member. The system may include a first adjustable rod connecting the first door leaf to the actuator and a second adjustable rod connecting the second door leaf to the actuator. The length of the first and second adjustable rods may be varied. In one example, once the doors reach the open position and the open preloaded force is achieved, one or both of the first and second adjustable rods may adjust lengths in order to maintain the open preloaded force. Once the door close signal is given, one or both of the first and second adjustable rods may adjust lengths to allow for the closing process to begin. In one example, once the doors reach the closed position and the closed preloaded force is achieved, one or both of the first and second adjustable rods may adjust lengths in order to maintain the closed preloaded force. Once the door open signal is given, one or both of the first and second adjustable rods may adjust lengths to allow for the opening process to begin.

In one example, one or more limit switches may be used to set and adjust adjustable rods and the mechanism end stop positions (i.e., the open position and the closed position). The limit switch may be a mechanical or electromechanical device that may be operated by a physical force applied to the switch by the rod or another portion of the door. The limit switch may detect the presence or absence of an object in the door system during opening or closing. The limit switch may be a roller, lever, whisker, plunger, a combination, or the like. The limit switch may be a sensor that detects strain on the connecting rod and compares this to a threshold value. Based on the movement of the rods, the limit switches may initiate a control signal to indicate that the rods are a maximum or minimum position. Additionally, if an object or obstacle is detecting during the opening or closing of the doors, the limit switch may be activated and may initiate a control signal or a control action. In one example, the control action may be to stop movement of the doors or may be to reverse movement of the doors. An obstacle may be detected by a force acting upon the rods which may activate the limit switch.

In one embodiment, a system may include an actuation device, a first door leaf, a second door leaf, and a first engagement member. The actuation device may move the first door leaf and the second door leaf between an open position and a closed position. The actuation device may provide an open preload force to the first door leaf and the second door leaf in the open position. The actuation device may provide a closed preload force to the first door leaf and the second door leaf in the closed position. The system may include one or more of: a first engagement member that may contact the actuation device, the first engagement member may allow movement of the actuation device to adjust the open preload force and the closed preload force; or the actuation device may be coupled with the first door leaf by a first rod and to the second door leaf by a second rod, at least one of the first rod or the second rod may adjust a length of the first rod or the second rod to maintain the open preload force in the open position and maintain the closed preload force in the closed position.

The system may include one or more sensors that may determine whether the first door leaf and the second door leaf are in the open position or the closed position. The actuation device may be driven by a motor. The system may include one or more sensors that may determine a current of the motor and may provide an output to a controller responsive to the current of the motor being above a predetermined threshold. The controller may prevent movement of the first door leaf and the second door leaf responsive to the current of the motor being above the predetermined threshold. The system may include one or more sensors that may determine an output of the motor. The one or more sensors may provide an output to a controller responsive to the output of the motor being outside a predetermined range. The controller may adjust the open preload force and the closed preload force based on the output of the motor being outside the predetermined range.

In one example, the first engagement member may include a spring that may apply a spring force to move the actuation device. The spring may provide at least a portion of the open preload force and at least a portion of the closed preload force. The system may include a second engagement member that may prevent movement of the actuation device during the movement of the first door leaf and the second door leaf between the open position and the closed position. The second engagement member may be one or more of a bumper or a second spring. The system may include an actuation device brake that may be engaged to inhibit movement of the actuation device in the open position and the closed position.

In one embodiment, a system may include an actuation device, a first door leaf, a second door leaf, a controller, and a first engagement member. The actuation device may move the first door leaf and the second door leaf between an open position and a closed position. The first door leaf and the second door leaf may be held in the open position by an open preload force from the actuation device. The first door leaf and the second door leaf may be held in the closed position by a closed preload force from the actuation device. The first engagement member may contact the actuation device. The controller may adjust the open preload force and the closed preload force by moving the actuation device relative to the first engagement member.

The actuation device may be driven by a motor. The controller may adjust an output of the motor to adjust the open preload force. In one example, the first engagement member may be a spring that may apply a spring force to move the actuation device. The spring may provide at least a portion of the open preload force and at least a portion of the closed preload force.

The system may include one or more sensors that may determine a current of the motor. The one or more sensors may provide an output to the controller responsive to the current of the motor being above a predetermined threshold.

In one example, a method may include loading a first door leaf and a second door leaf in an open position with an open preload force from an actuation device. The method may include loading the first door leaf and the second door leaf in a closed position with a closed preload force from the actuation device. The method may include controlling the open preload force and the closed preload force by loading a spring contacting the actuation device and allowing movement of the actuation device.

The actuation device may be driven by a motor. The method may include adjusting the open preload force and the closed preload force based on one or more operating characteristics. The operating characteristics may include one or more of a motor current, a motor output, a moving speed of the first door leaf, a moving speed of the second door leaf, a position of the first door leaf, or a position of the second door leaf. The method may include preventing the movement of the actuation device in the open position and the closed position with an actuation device brake.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following clauses, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such clauses are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system, comprising:

an actuation device configured to move a first door leaf and a second door leaf between an open position and a closed position;

the actuation device configured to provide an open preload force to the first door leaf and the second door leaf in the open position;

the actuation device configured to provide a closed preload force to the first door leaf and the second door leaf in the closed position; and a first engagement member configured to contact the actuation device, the first engagement member configured to allow movement of the actuation device to adjust the open preload force and the closed preload force, the first engagement member is configured to provide at least a portion of the open preload force and at least a portion of the closed preload force, the actuation device is configured to be coupled with the first door leaf by a first rod and to the second door leaf by a second rod, at least one of the first rod or the second rod configured to adjust a length of the first rod or the second rod to maintain the open preload force in the open position and maintain the closed preload force in the closed position.

2. The system of claim 1, further comprising one or more sensors configured to determine whether the first door leaf and the second door leaf are in the open position or the closed position.

3. The system of claim 1, wherein the first engagement member includes a spring configured to apply a spring force to move the actuation device.

4. The system of claim 3, wherein the spring force is configured to provide at least a portion of the open preload force and at least a portion of the closed preload force.

5. The system of claim 3, further comprising a second engagement member configured to prevent movement of the actuation device during the movement of the first door leaf and the second door leaf between the open position and the closed position.

6. The system of claim 5, wherein the spring is a first spring, and wherein the second engagement member is at least one of a bumper or a second spring.

7. The system of claim 1, further comprising an actuation device brake configured to be engaged to inhibit movement of the actuation device in the open position and the closed position.

8. The system of claim 1, wherein the actuation device is configured to be driven by a motor, further comprising one or more sensors configured to determine a current of the motor and provide an output to a controller responsive to the current of the motor being above a predetermined threshold.

9. The system of claim 8, wherein the controller is configured to prevent movement of the first door leaf and the second door leaf responsive to the current of the motor being above the predetermined threshold.

10. The system of claim 8, further comprising one or more sensors configured to determine an output of the motor and provide an output to a controller responsive to the output of the motor being outside a predetermined range.

11. The system of claim 10, wherein the controller is configured to adjust the open preload force and the closed preload force based on the output of the motor being outside the predetermined range.

12. The system of claim 1, further comprising a first adjustable rod configured to connect the first door leaf to the actuation device.

13. A system, comprising:

an actuation device configured to move a first door leaf and a second door leaf between an open position and a closed position;

a controller configured to be coupled with the actuation device and an actuation device brake;

wherein the first door leaf and the second door leaf are configured to be held in the open position by an open preload force from the actuation device;

wherein the first door leaf and the second door leaf are configured to be held in the closed position by a closed preload force from the actuation device;

a first engagement member configured to contact the actuation device, the first engagement member configured to allow movement of the actuation device to adjust the open preload force and the closed preload force, the first engagement member is configured to provide at least a portion of the open preload force and at least a portion of the closed preload force;

wherein the controller is configured to adjust the open preload force and the closed preload force.

14. The system of claim 13, wherein the actuation device is configured to be driven by a motor, and wherein the controller is configured to adjust an output of the motor to adjust the open preload force or the closed preload force.

15. The system of claim 13, wherein the first engagement member is a spring configured to apply a spring force to move the actuation device.

16. The system of claim 15, wherein the spring force is configured to provide at least a portion of the open preload force and at least a portion of the closed preload force.

17. The system of claim 13, wherein the actuation device is configured to be driven by a motor, further comprising one or more sensors configured to determine a current of the motor and provide an output to the controller responsive to the current of the motor being above a predetermined threshold.

18. A vehicle comprising:

a first door leaf and a second door leaf;

an actuation device configured to move the first door leaf and the second door leaf between an open position and a closed position;

the actuation device configured to provide an open preload force to the first door leaf and the second door leaf in the open position;

the actuation device configured to provide a closed preload force to the first door leaf and the second door leaf in the closed position; and a first engagement member configured to contact the actuation device, the first engagement member configured to allow movement of the actuation device to adjust the open preload force and the closed preload force, wherein the first engagement member is configured to provide at least a portion of the open preload force and at least a portion of the closed preload force, the actuation device is coupled with the first door leaf by a first rod and to the second door leaf by a second rod, at least one of the first rod or the second rod configured to adjust a length of the first rod or the second rod to maintain the open preload force in the open position and maintain the closed preload force in the closed position.

19. The vehicle of claim 18, further comprising one or more sensors configured to determine whether the first door leaf and the second door leaf are in the open position or the closed position.

20. The vehicle of claim 18, wherein the first engagement member includes a spring configured to apply a spring force to move the actuation device, and wherein the spring force is configured to provide at least a portion of the open preload force and at least a portion of the closed preload force.

* * * * *